United States Patent [19]

Vollmann et al.

[11] Patent Number: 5,187,629
[45] Date of Patent: Feb. 16, 1993

[54] CASSETTE WITH MAGNETIC TAPE ON TWO COPLANAR REELS

[75] Inventors: Norbert C. Vollmann; Jan Dewolf, both of Eindhoven, Netherlands; Günther Bernauer, St. Pölten, Austria; Anton Stöger, Vienna, Austria; Marco V. Koningsberger, Mödling, Austria

[73] Assignee: U.S. Philips Corporation, New York, N.Y.

[21] Appl. No.: 685,384

[22] Filed: Apr. 11, 1991

[30] Foreign Application Priority Data

Sep. 24, 1990 [NL] Netherlands ......................... 9002082

[51] Int. Cl.⁵ ........................................... G11B 23/093
[52] U.S. Cl. ..................................................... 360/132
[58] Field of Search ....................... 360/132; 242/192; 206/387

[56] References Cited

U.S. PATENT DOCUMENTS

| | | | |
|---|---|---|---|
| 4,304,331 | 12/1981 | Minkow | 206/387 |
| 4,322,000 | 3/1982 | Struble | 206/387 |
| 4,497,008 | 1/1985 | Schoenmakers | 360/132 |
| 4,618,903 | 10/1986 | Oishi et al. | 360/132 |
| 4,678,138 | 7/1987 | Nemoto | 360/132 X |

Primary Examiner—John H. Wolff
Attorney, Agent, or Firm—Brian J. Wieghaus

[57] ABSTRACT

A cassette comprises a housing which accommodates a magnetic tape partly wound on two reel hubs. A main wall of the housing has two openings which are coaxial with the reel hubs to allow the passage of reel spindles of a drive apparatus. The cassette further comprises a slide cover for covering the openings, which slide cover comprises blocking members which can cooperate with the reel hubs to inhibit their rotation. For this purpose the wall with openings has diametrically opposed recesses or cut-outs to allow the blocking members to engage with inner teeth provided in the reel hubs.

20 Claims, 4 Drawing Sheets

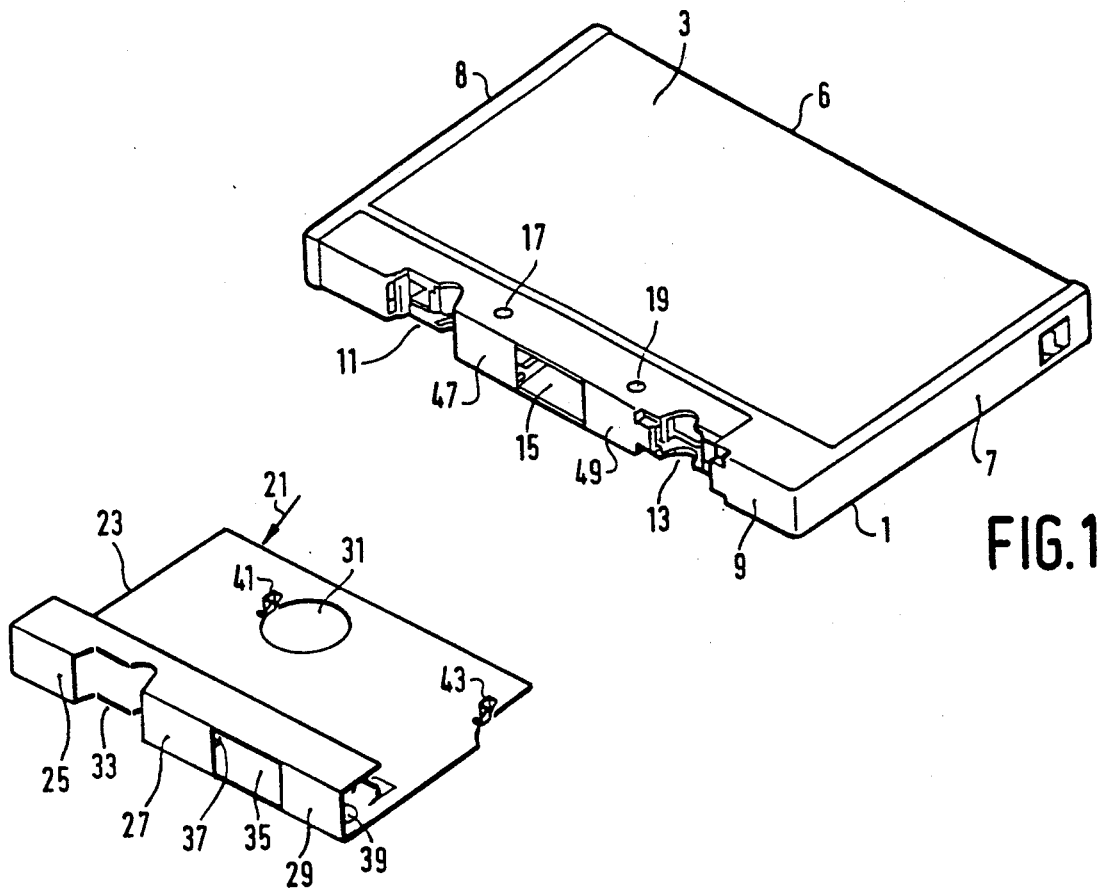
FIG. 1
FIG. 2
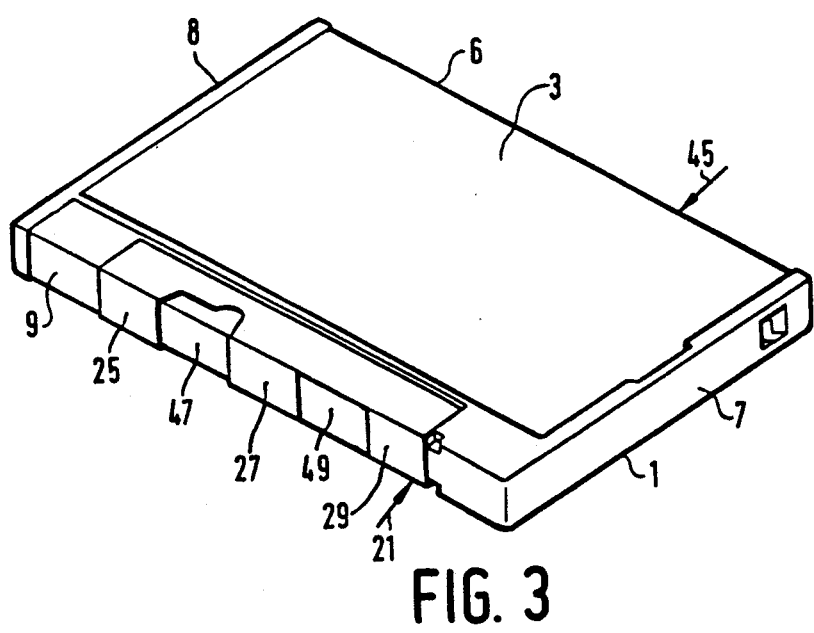
FIG. 3

CASSETTE WITH MAGNETIC TAPE ON TWO COPLANAR REELS

BACKGROUND OF THE INVENTION

The invention relates to a cassette with magnetic tape on two coplanar reels and comprising: a housing having a main wall formed with two openings for reel spindles of a drive apparatus, two coplanar rotatable reel hubs which are coaxial with the openings and having central means for cooperation with the reel spindles, a slide cover which is slidable on the housing between an open position, in which the openings are not covered, and a closed position, in which the openings are covered, and blocking members movable between a blocking position and a non-blocking operating position which cooperate with the reel hubs to inhibit their rotation in the blocking position and which do not obstruct the reel hubs to allow their rotation in the operating position.

A cassette of this type, referred to as an RDAT cassette, is known, for example from European Patent Application 0,210,854 A2 which corresponds to U.S. Pat. No. 4,714,213 (herewith incorporated by reference). The known cassette is of the non-reversible type, so that only one of the two main walls has openings for reel spindles. A slide cover is slidable over this main wall, from the front to the rear of the cassette. The slide cover has openings corresponding to openings in the adjacent main wall. In the closed position the openings in the main wall are covered and the corresponding openings in the slide cover imperforate parts of the main wall. In the open position the openings in the main wall and the slide cover are coaxial to provide free access to the reel hubs for the reel spindles. A hinged shutter is situated at the front of the cassette to cover a part of the magnetic tape which extends along the cassette front in a closed position of this shutter. To use the cassette on an apparatus both the slide cover and the shutter are moved from their closed to their open positions. In the interior of the cassette housing a blocking member has been provided for cooperation with the hinged shutter, which member takes the form of a plate having two projections, which plate is slidable from the front to the rear of the cassette. Inside the housing the plate is movable over the imperforate main wall. At an end facing the imperforate main wall each of the two reel hubs has been provided with teeth at its outer circumference. When the shutter is closed the projections of the blocking member engage the teeth of the reel hubs to inhibit rotation of the reel hubs. When the shutter is opened the blocking member is pulled towards the front of the cassette against spring force by cooperation with the shutter, so that the projections are disengaged from the teeth to allow rotation of the reel hubs.

Generally speaking, it is important to block the reel hubs of a cassette as long as the cassette is not in a drive apparatus. Indeed, if the reel hubs are not blocked, movements of the cassette, for example when it is handled or as a result of vibrations in a storage rack in a car, are likely to give rise to a rotation of the reel hubs with consequent looping of the magnetic tape. This may result in damage to the magnetic tape and possibly in malfunctioning of the cassette in a drive apparatus. For the well-known Compact Cassettes, in which as is known the openings in the two main walls are not closed, this problem has been solved by providing a special storage case for the cassette. The storage case comprises locking members which are engageable in the holes in the reel hubs to inhibit rotation of the reel hubs. Such a solution cannot be adopted for cassettes of the type defined in the opening paragraph, the openings being covered by the slide cover when the cassette is outside a drive apparatus. However, the solution which has been adopted is comparatively intricate and requires the use of a separate moving part, i.e. the blocking member which is movable over the inner surface of the imperforate main wall. The blocking member requires a certain mounting height in the interior of the cassette, which results in a greater height of the cassette.

SUMMARY OF THE INVENTION

It is an object of the invention to provide a cassette of the type defined in the opening paragraph, which has the advantage that it does not require a separate movable part occupying part of the mounting height inside the cassette and which does not necessitate the use of a hinged shutter.

To this end the cassette in accordance with the invention is characterized in that the blocking members are connected to the slide cover, and in the closed position of the slide cover the blocking members are in the blocking position and in the open position of the slide cover said members are in the operating position.

The great advantage of the cassette in accordance with the invention is that the blocking members no longer form part of a separate movable part but are connected to the slide cover and are movable along with this cover. Moreover, the absence of a movable blocking member inside the cassette housing enables the cassette to be thinner than the afore-mentioned prior-art cassette. Since the blocking members have been connected to the slide cover and, as a consequence, their function is derived from the movements of the slide cover itself, no separate hingeable shutter on the cassette is needed for its actuation. This renders the invention very suitable for cassettes without a shutter, such as the cassette in accordance with the Applicant's prior Patent Application NL 8901712 (herewith incorporated by reference).

In many cassettes the reel hubs are situated completely inside the housing. In the case of a cassette having a slide cover such a construction has the additional advantage that the slide cover can be entirely flat because it need not cover any reel-hub portions projecting from the housing. For cassettes of this type an embodiment of the invention is of interest, which is characterized in that the blocking members extend transversely of the main wall towards the interior of the cassette, and the main wall has openings to provide access to reel-hub portions inside the housing for the blocking members. Suitably, this embodiment is further characterized in that the reel hubs each have a reel-spindle hole bounded by an inner wall, and the inner walls of the reel hubs and the blocking members each comprise radially oriented portions which interengage when the slide cover is in its closed position. Since the blocking members cooperate with the interiors of the reel hubs the reel hubs need not have unnecessarily large axial dimensions.

Preferably, an embodiment which performed satisfactorily in the development stage is characterized in that around each opening the main wall has a coaxial annular wall directed towards the interior of the housing and having a specific height relative to the inner side of the main wall, the blocking members are diametrically movable in the openings, each of the annular walls has diametrically opposed first and second recesses or cut-outs having a width greater than the width of a blocking member, the inner walls of the reel hubs have portions surrounding said annular walls, said first recess or cut-out traverses the annular wall in a radial direction and allows the passage of the blocking member into the blocking position near the inner wall of the reel hub, and said second recess accommodates the blocking member in the operating position. In various known cassettes annular walls of the kind described have been provided to limit radial displacements of the reel hubs. Known cassettes having such annular walls are, for example, the Compact Cassettes and the afore-mentioned RDAT cassettes. The provision of cut-outs or recesses in the annular walls does not affect the function of the annular walls to limit the radial displacements of the reel hubs. When this embodiment is used no additional mounting height is required for the blocking members.

A favourable embodiment of the invention is characterized in that inner reel-hub wall portions surrounding the annular walls have internal teeth, and the blocking members comprise corresponding portions which engage the teeth in the blocking position. As in practice the reel hubs are always made of a plastics the formation of internal teeth does not pose any technical problems. In just the same way as in the afore-mentioned known RDAT cassette, where the reel hubs have external teeth, the reel hubs in the cassette in accordance with the invention can be blocked in a number of different angular positions, depending on the number of teeth.

An embodiment of the invention which is useful in conjunction with the preceding embodiment is characterized in that the blocking-member portions which are engageable with the teeth comprise blocking-member portions oriented perpendicularly to the remainder of the blocking member.

A very important further embodiment of the invention is characterized in that in the operating position the blocking means are situated between the central means of the reel hubs for cooperation with the reel spindles of a drive apparatus and the internal teeth of the reel hubs. This has the advantage that no additional constructional measures are necessary in order to ensure that in the operating position the blocking member is clear of the reel hubs. It is merely necessary to dimension the relevant parts properly, as will be explained with reference to the drawings.

Another preferred embodiment of the invention is characterized in that the slide cover is made of metal sheet and the blocking members comprise sheet portions bent out of the plane of the sheet. As is known, the use of a metal slide cover has a number of advantages. The material of the slide cover can be very thin, so that the contribution of the slide cover to the overall thickness of the cassette is small. Moreover, a metal slide may constitute an important aesthetic feature of a cassette. No extra material is needed to form the blocking members. This is because these members can be formed from the material which would otherwise form the scrap material left after punching out the openings in the slide cover.

BRIEF DESCRIPTION OF THE DRAWINGS

An embodiment of the cassette in accordance with the invention will now be described in more detail by way of example with reference to the drawings. In the drawings FIG. 1 is a perspective plan view showing a housing of a cassette in accordance with the invention, FIG. 2 is a perspective view of a metal slide formed with blocking members, FIG. 3 is a perspective view, similar to FIG. 1, but now with the slide of FIG. 2 mounted on the housing.

DESCRIPTION OF THE PREFERRED EMBODIMENT

Figure 4:
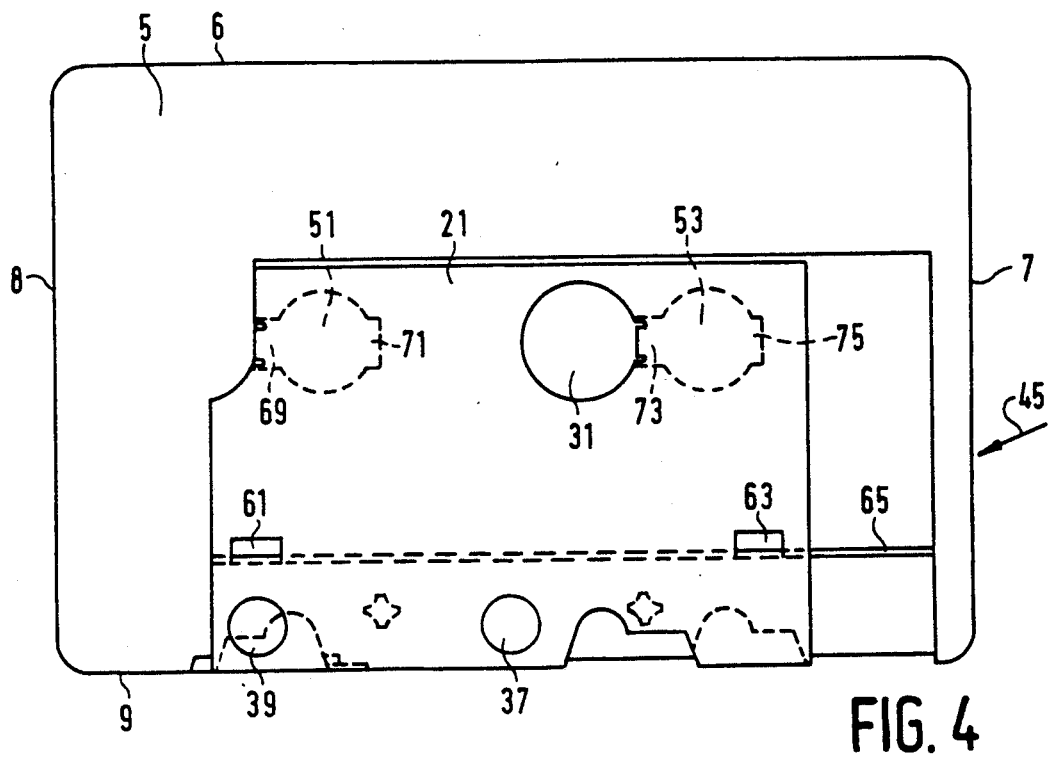
FIG. 4 is an underneath view of the cassette of FIG. 3, showing the slide cover in the closed position.
Figure 5:
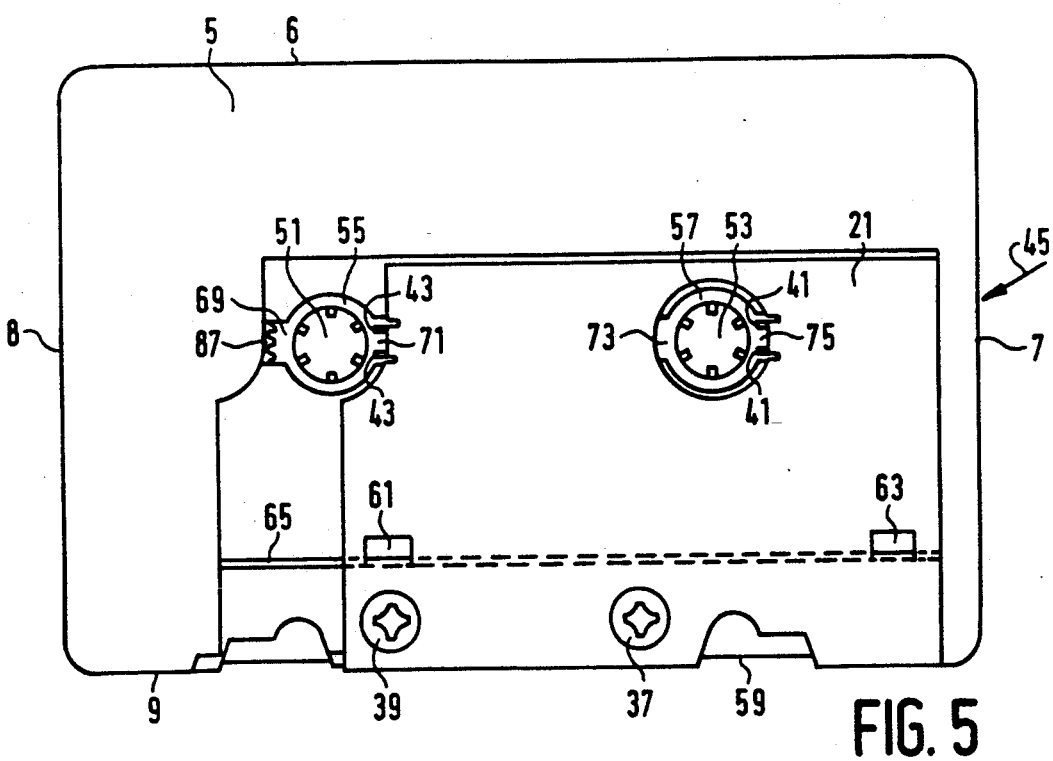
FIG. 5 is a view similar to FIG. 4, showing the slide cover in the open position.
Figure 6:
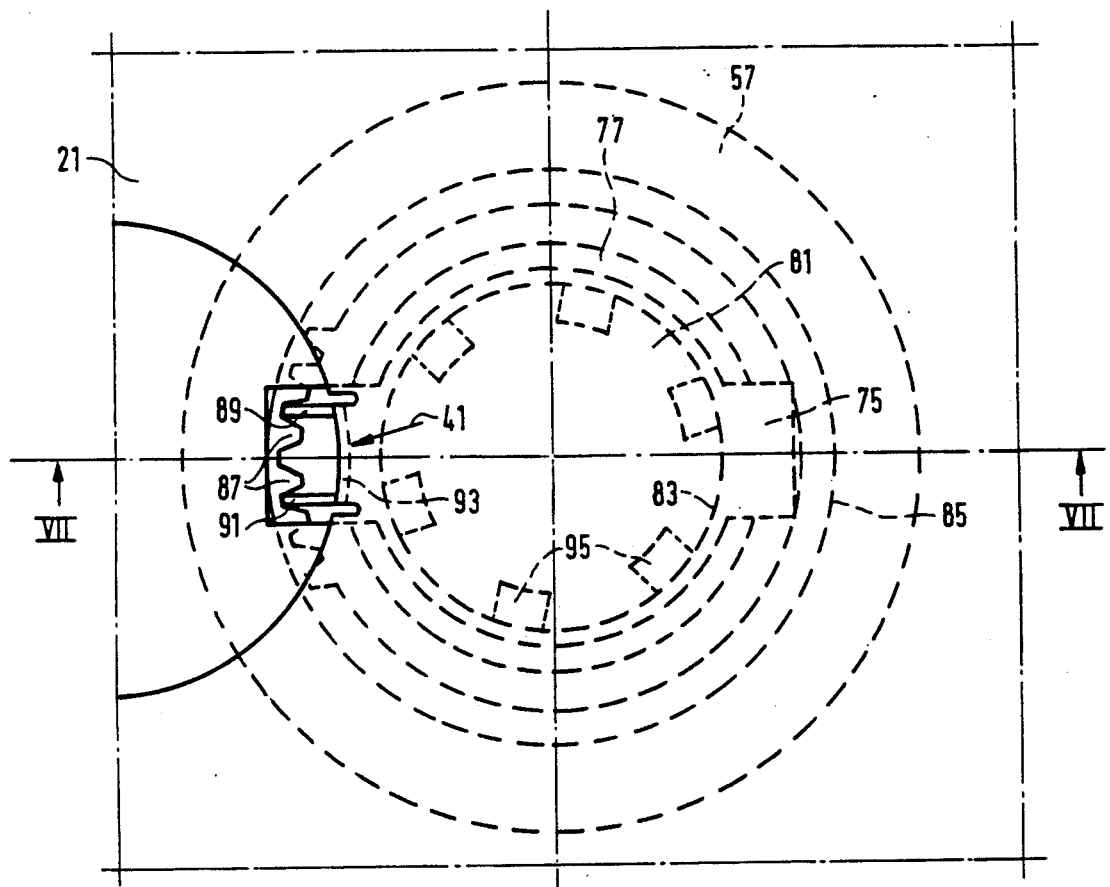
FIG. 6 shows to an enlarged scale a part of the underneath view in FIG. 4 near an opening.
Figure 7:
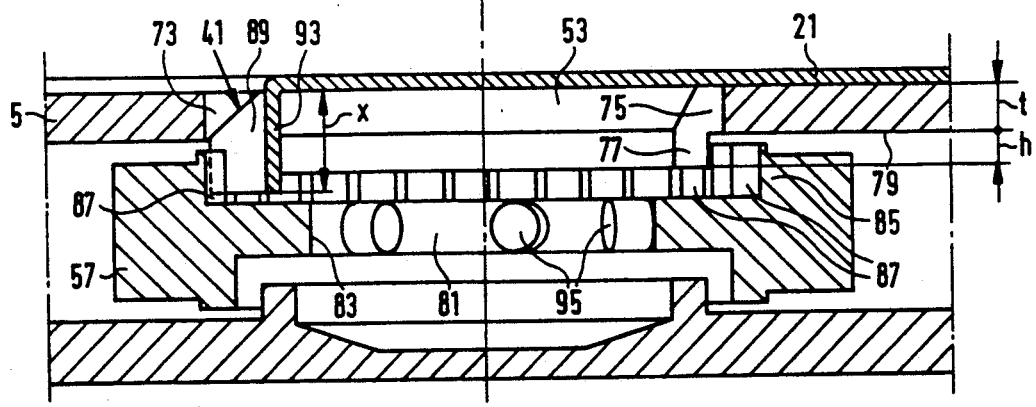
FIG. 7 is a cross-sectional view of the part shown in FIG. 6, taken on the lines VII—VII.

The Figures have been drawn to an arbitrary scale, which is not the same in all Figures. The shown cassette 45 comprises a housing 1 having two parallel main walls 3, 5 and various transverse walls 6–9. The transverse wall 9 is a front wall with pressure-roller openings 11, 13 and a magnetic-head opening 15. The main wall 3 is substantially imperforate and near the front wall 9 it has locating apertures 17, 19 and recesses for the passage of pressure rollers and capstans during cooperation with a drive apparatus. The openings and recesses can be covered by means of a slide cover 21 shown in FIG. 2. For this purpose the slide cover comprises cover portions 23, 25, 27, 29, which cover the openings and recesses in a closed position of the slide cover (FIG. 4). In an open position (FIG. 5) the openings 31, 33, 35, 37, 39 in the slide cover expose the openings and recesses in the housing.

The slide cover comprises blocking members 41 and 43, which in the closed position of said slide cover cooperate with reel hubs 55 and 57 in the housing to inhibit rotation of these hubs. FIG. 3 shows the cassette 45 with the slide cover 21 mounted on the housing in the closed position. The cover portions 25, 27 and 29 cover the openings 11, 13, and 15 in the front wall of the cassette. In the closed position the openings 33 and 35 are situated at the location of the imperforate wall portions 47 and 49 of the front wall.

The main wall 5 of the cassette has two openings 51 and 53 for the passage of reel spindles of a drive apparatus. The cassette comprises two rotatable reel hubs 55 and 57, which are disposed in the same plane and which are coaxial with said openings. The reel hubs (not shown) contain a spool of magnetic tape 59, which extends partly along the front wall 9 of the housing. The slide cover 21 is slidable over the housing 1 and is guided by two bent lugs 61 and 63 which engage a slot 65 formed in the main wall 5.

The main wall 5 has further openings to provide access to portions of each of the two reel hubs for the blocking members 41 and 43. These further openings are formed by diametrically opposed first and second recesses or cut-outs 69, 73 and 71, 75 respectively at opposite sides of the openings 51 and 53.

FIGS. 6 through 9 show details of the blocking member 41, the reel hub 51 and the housing 1 at the location of the opening 53. Around the opening 53 the main wall 5 has been provided with a coaxial annular wall 77 directed towards the interior of the housing and having a height "h" relative to the inner side 79 of the main wall. The reel hub 57 has a reel-spindle hole 81, which is bounded by an inner wall 83 having a portion 85 with internal teeth 87, situated around the annular wall 77. The blocking member 41 is fixedly connected to the slide cover 21 and extends transversely of the main wall 5, the dimension "x" of the blocking member in a direction perpendicular to the main wall being substantially equal to the sum of the thickness "t" of the main wall 5 and the height "h" of the annular wall 77.

The blocking member 41 has portions 89, 91 oriented perpendicularly to the remainder 93 of the blocking member. In the blocking position these portions engage the internal teeth 87. For this purpose the first recess or cut-out 73 traverses the annular wall 77 in a radial direction, so that the block member 41 can reach the inner wall 83 of the reel hub 57 through the first recess or cut-out.

Figure 8:
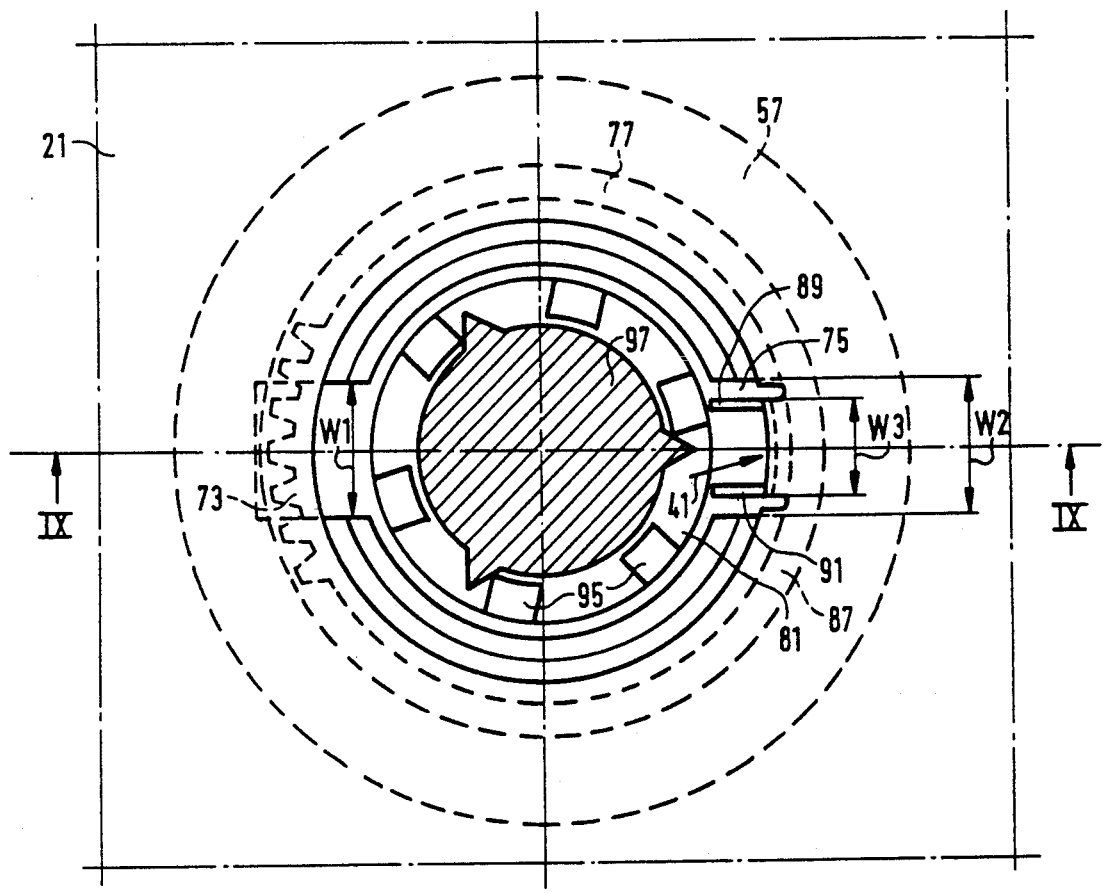
FIG. 8 shows to an enlarged scale a part of the underneath view in FIG. 4 near an opening, a reel spindle engaging this opening being shown in sectional view.
Figure 9:
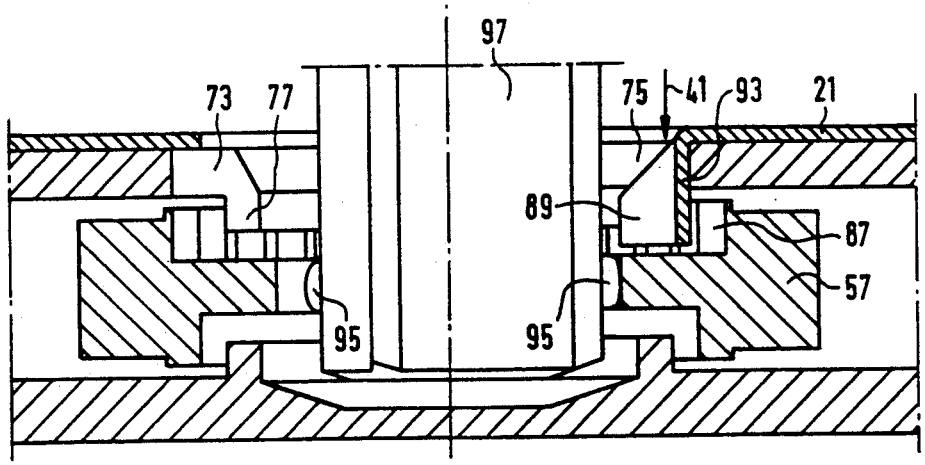
FIG. 9 shows the part of FIG. 8 in a cross-sectional view taken on the lines IX—IX.

FIGS. 8 and 9 show the blocking member 41 in the second recess or cut-out 75 in the operating position, in which the reel hub 57 is not blocked and can rotate freely. For this it is necessary that the width "W1" and "W2" of the recesses or cut-outs 73 and 75 are greater than the width "W3" of the blocking member 41.

The reel hub 57 has central means 95 engageable with a reel spindle 97 of a drive apparatus to rotate the reel hub. In the operating position the blocking member 41 is situated between the internal teeth 87 and the central means 95 and hence does not obstruct the reel-spindle hole 97 and the reel hub 57, so that the reel spindle 97 can drive the reel hub 57 without being hindered.

The slide cover 21 is made of stainless steel sheet and the blocking members 41 are formed by bent portions of the sheet material.

It is to be noted that the invention is not limited to the embodiment shown but relates to any embodiment possible within the scope defined by the appended claims. For example, the blocking members may be constituted by separate parts fixedly or non-fixedly secured to the slide cover. Instead of one opening 31 the slide cover may have two such openings. The slide cover and the blocking members may be made of other and mutually different materials. The blocking members may cooperate with reel-hub portions projecting through the main wall externally of the housing. The blocking members may cooperate with an outer wall of the reel hubs instead of with an inner wall. The blocking members may be connected both to the slide cover and to the cassette housing. Etc.

We claim:

1. A cassette with magnetic tape on two coplanar reels and comprising
   a housing having a main wall formed with two openings for receiving reel spindles of a drive apparatus,
   two coplanar rotatable reel hubs which are coaxial with the openings and having central means for cooperation with the reel spindles of the drive apparatus,
   a slide cover which is slidable along the main wall of the housing between an open position, in which the openings in the main wall are not covered, and a closed position, in which the openings are covered, and
   blocking members movable between a blocking position and a non-blocking operating position which cooperate with the reel hubs to inhibit their rotation in the blocking position and which do not obstruct the reel hubs to allow their rotation in the operating position, characterized in that:
   the blocking members are connected to the slide cover such that in the closed position of the slide cover the blocking members are in the blocking position and in the open position of the slide cover the blocking members are in the operating position 2. A cassette as claimed in claim 1, characterized in that
   the blocking members extend transversely of the main wall towards the interior of the cassette, and
   the main wall has openings to provide access to portions of the reel-hubs inside the housing for the blocking members to inhibit rotation of the reel hubs.

3. A cassette as claimed in claim 2, characterized in that
   the reel hubs each have a reel-spindle hole bounded by an inner wall, and
   the inner walls of the reel hubs and the blocking members each comprise radially oriented portions which interengage when the slide cover is in its closed position.

4. A cassette as claimed in claim 3, characterized in that
   around each opening the main wall has a coaxial annular wall directed towards the interior of the housing and having a specific height relative to the inner side of the main wall,
   the blocking members are diametrically movable in the openings,
   each of the annular walls has diametrically opposed first and second apertures having a width greater than the width of a blocking member,
   the inner walls of the reel hubs have portions surrounding said annular walls,
   said first apertures traverses the annular wall in a radial direction and allows the passage of the blocking member into the blocking position near the inner wall of the reel hub, and
   said second recess accommodates the blocking member in the operating position.

5. A cassette as claimed in claim 4, characterized in that
   the inner reel-hub wall portions surrounding the annular walls have internal teeth, and
   the blocking members comprise corresponding portions which engage the teeth in the blocking position.

6. A cassette as claimed in claim 5, characterized in that the blocking-member portions which are engageable with the teeth comprise blocking-member portions oriented perpendicularly to the remainder of the blocking member.

7. A cassette as claimed in claim 6, characterized in that in the operating position the blocking members are situated between the central means of the reel hubs and the internal teeth of the reel hubs.

8. A cassette as claimed in claim 7, characterized in that the slide cover is made of metal sheet and the blocking members comprise sheet portions bent out of the plane of the sheet.

9. A cassette as claimed in claim 6, characterized in that the slide cover is made of metal sheet and the blocking members comprise sheet portions bent out of the plane of the sheet.

10. A cassette as claimed in claim 5, characterized in that in the operating position the blocking members are situated between the central means of the reel hubs and the internal teeth of the reel hubs.

11. A cassette as claimed in claim 5, characterized in that the slide cover is made of metal sheet and the blocking members comprise sheet portions bent out of the plane of the sheet.

12. A cassette as claimed in claim 4, wherein in the operating position the blocking members are situated between the central means of the reel hubs and the inner wall portions of the reel hubs which surround the respective annular wall of the main wall.

13. A cassette as claimed in claim 4, characterized in that the slide cover is made of metal sheet and the blocking members comprise sheet portions bent out of the plane of the sheet.

14. A cassette as claimed in claim 3, wherein in the operating position the blocking members are situated between the central means of the reel hubs and the inner wall of the reel hubs in such a manner that the driving of the reel hubs by the reel spindles of the driving apparatus is not inhibited.

15. A cassette as claimed in claim 2, characterized in that the slide cover is made of metal sheet and the blocking members comprise sheet portions bent out of the plane of the sheet.

16. A magnetic tape cassette, comprising:
a) a housing having a main wall with two openings for receiving reel spindles of a drive apparatus;
b) two rotatable reel hubs within said housing and coaxial with said openings, said reel hubs having central means engageable with the reel spindles of the drive apparatus for rotating said reel hubs; and
c) a slide cover slidable along the main well said housing between an open position in which said openings in said main wall are not covered and a closed position in which said openings are covered, said slide cover including blocking means engageable with said reel hubs for blocking rotation of said reel hubs in the closed position of said slide cover, in the open position of said slide cover said blocking means not inhibiting rotation of said reel hubs.

17. A magnetic tape cassette as claimed in claim 16, wherein a said reel hub includes an inner circumferential wall with which said blocking means engages in the closed position of said slide.

18. A magnetic tape cassette apparatus as claimed in claim 17, wherein said blocking means comprises a projection projecting into said reel hub transversely to said main cassette wall, said projection being diametrically movable in said reel hub between said open and closed positions of said slide cover, in said closed position said projection engaging said inner circumferential wall at a first diametral position and in said open position said projection being radially disposed between said central means and a second diametral position of said inner circumferential wall diametrically opposite said first diametral position.

19. A magnetic tape cassette apparatus as claimed in claim 18, wherein said slide cover and said blocking means consist of an integral metal sheet.

20. A magnetic tape cassette apparatus as claimed in claim 17, wherein said slide cover and said blocking means consist of an integral metal sheet.

* * * * *